United States Patent [19]
Doane

[11] 3,893,831
[45] July 8, 1975

[54] GREASE EXTRACTOR FOR KITCHEN VENTILATING SYSTEMS

[75] Inventor: DeWitt H. Doane, Long Grove, Ill.

[73] Assignee: Doane Manufacturing Company, Wheeling, Ill.

[22] Filed: Oct. 10, 1972

[21] Appl. No.: 296,128

[52] U.S. Cl. .................. 55/242; 55/217; 55/436; 55/DIG. 36; 98/115 K
[51] Int. Cl............................................ B01d 45/18
[58] Field of Search .............................. 55/240–242, 55/260, 220, 229, 442–446, DIG. 36, 436, 217; 261/115–118, 126; 98/115 K, 121 SB; 239/289; 166/65

[56] References Cited
UNITED STATES PATENTS

| | | | |
|---|---|---|---|
| 2,180,586 | 11/1939 | Gustafsson...................... | 55/241 X |
| 2,385,077 | 9/1945 | Harker et al...................... | 55/241 X |
| 2,546,259 | 3/1951 | Fenn................................. | 55/240 X |
| 2,643,105 | 6/1953 | Lipowitz........................... | 261/115 |
| 3,018,847 | 1/1962 | Stanly............................... | 261/111 X |
| 3,207,058 | 9/1965 | Gaylord........................... | 55/DIG. 36 |
| 3,324,629 | 6/1967 | Graswich et al.................. | 55/240 |
| 3,490,206 | 1/1970 | Doane............................... | 55/445 X |
| 3,731,462 | 5/1973 | Costarella et al................. | 55/260 |
| 3,770,061 | 11/1973 | Hall................................. | 55/DIG. 36 |
| 3,785,124 | 1/1974 | Gaylord........................... | 55/242 |

FOREIGN PATENTS OR APPLICATIONS 2,117,158   4/1971   Germany ............................ 55/244

Primary Examiner—Bernard Nozick
Assistant Examiner—David L. Lacey
Attorney, Agent, or Firm—Wolfe, Hubbard, Leydig, Voit & Osann, Ltd.

[57] ABSTRACT

A grease extractor for removing grease, oil and other contaminants from a vaporous exhaust stream in a kitchen ventilating system. The extractor housing forms a restricted, horizontally elongated entrance way in the bottom half of the front wall, and an exit opening in the top wall. The exhaust stream is drawn into the housing through the entranceway where an entrance baffle deflects the gas stream downwardly and rearwardly. The exhaust stream is then drawn upwardly through the extractor by a fan or blower downstream of the extractor, and engages a rear baffle above the entrance baffle for deflecting the exhaust stream forwardly over the entrance baffle. A top baffle mounted on the inside of the front wall of the extractor then deflects the exhaust stream rearwardly again before it is discharged through the exit opening. The rear baffle forms a fluid manifold at the forward end thereof and has a plurality of nozzles spaced along both the top and bottom of the manifold for discharging a cleaning or fire extinguishing fluid into the extractor both above and below the rear baffle.

10 Claims, 3 Drawing Figures

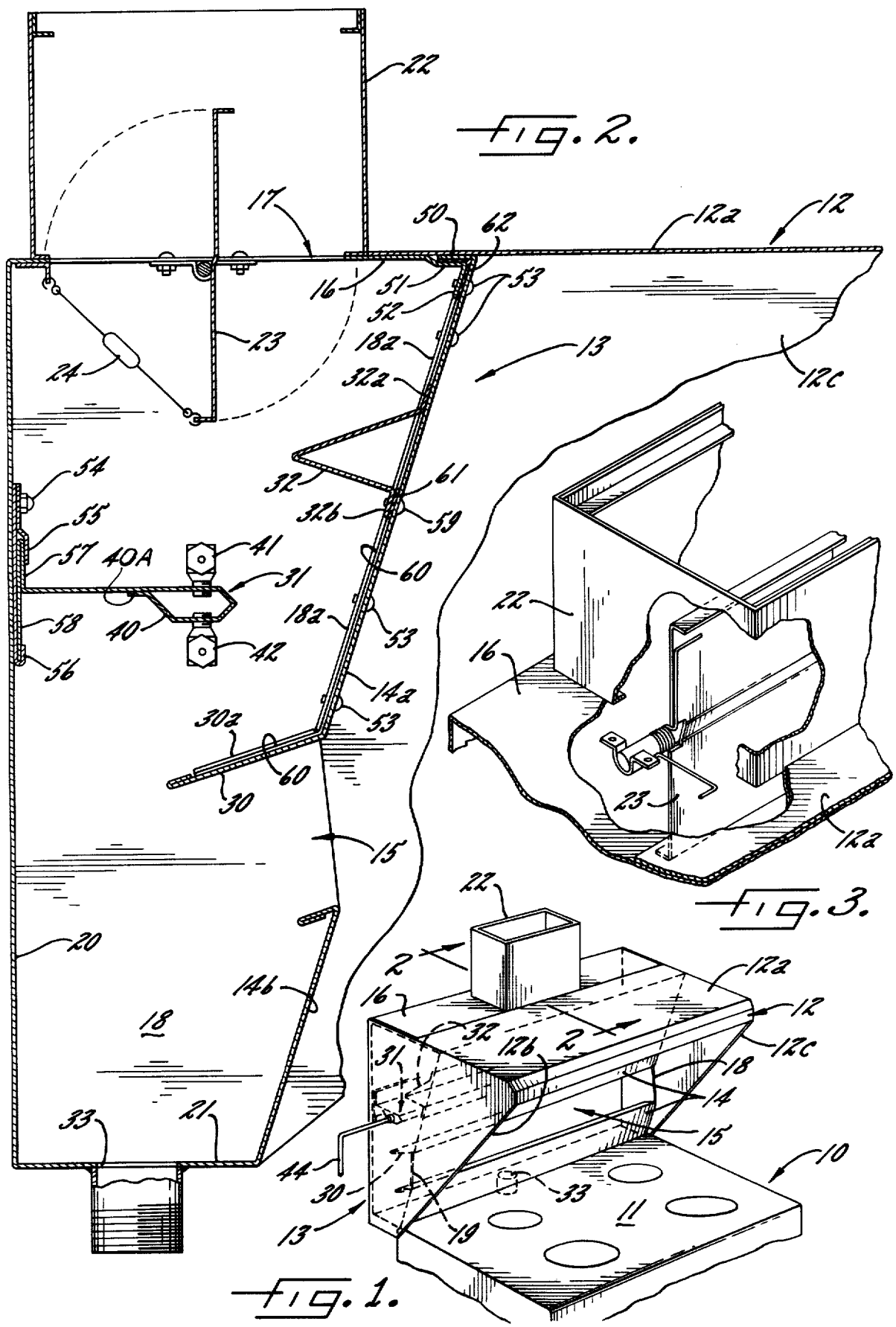

GREASE EXTRACTOR FOR KITCHEN VENTILATING SYSTEMS

DESCRIPTION OF THE INVENTION

The present invention relates generally to kitchen ventilating systems and, more particularly, to grease extractors for extracting condensable contaminants such as grease and oil from the vaporous exhaust stream in a kitchen ventilating system before the exhaust stream is discharged to the atmosphere.

It is a primary object of the present invention to provide a grease extractor which combines good grease extraction performance, the capability of distributing a selected fluid throughout the interior of the extractor and a low manufacturing cost. A more specific object of the invention is to provide such a grease extractor which includes means for distributing a cleaning and/or fire extinguishing fluid throughout the interior of the extractor.

Another object of the invention is to provide a grease extractor of the foregoing type in the form of a module which can be used in a variety of different types and sizes of ventilator systems.

It is a further object of the invention to provide a grease extractor of the type described above which can be readily fabricated in a variety of different sizes, from a relatively small number of parts.

Still another object of the invention is to provide such a grease extractor which is easy to install and maintain, and which provides ready access to the interior of the extractor for cleaning and/or service purposes.

Other objects and advantages of the invention will become apparent from the following detailed description and upon reference to the accompanying drawings, in which:

FIG. 1 is a perspective view of a conventional cooking range and its associated ventilating system including a grease extractor embodying the present invention;

FIG. 2 is an enlarged vertical section of the grease extractor shown in FIG. 1; and FIG. 3 is an enlarged perspective of the top of the extractor of FIG. 1 with a fragment broken away to show the damper arrangement.

While the invention will be described in connection with a certain preferred embodiment, it will be understood that it is not intended to limit the invention to this particular embodiment. On the contrary, it is intended to cover all alternatives, modifications, and equivalent arrangements as may be included within the spirit and scope of the invention as defined by the appended claims.

Turning now to the drawings and referring first to FIG. 1, there is shown a cooking range 10 having a cooking surface 11 from which hot fumes laden with grease and oil vapors and other condensable contaminants rise upwardly toward a canopy or hood 12 which projects out over at least a portion of the cooking surface 11. The hood 12 comprises a top 12a and a pair of side walls 12b and 12c, and is mounted on a grease extractor 13 having a front wall 14 forming a vertically restricted, horizontally elongated entranceway 15, and a top wall 16 forming an exit opening 17. The remainder of the extractor is completely enclosed by a pair of sidewalls 18 and 19, a rear wall 20, and a bottom wall 21.

As the hot, grease-laden fumes rise upwardly beneath the hood 12, they are drawn into and through the extractor 13 by means of a fan or blower (not shown) mounted within a flue or vent duct 22 connected to the exit opening 17. For the purpose of closing the duct 22 in the event of a fire in the ventilator system, a fire door 23 is journalled in the duct 22 and held open by a conventional wire including fusible links 24 adapted to fuse and thereby release the fire door 23 for movement to its closed position in response to a predetermined temperature. The rate at which the exhaust stream is drawn through the extractor 13 is determined by the downstream blower, a typical flow rate being 300 cubic feet per minute per lineal foot of ventilator (cfm). As the exhaust stream leaves the extractor 13, it is conducted via the duct 22 to an appropriate outlet for discharge to the atmosphere. It will be understood that in-duct blower represents only one example of a suitable device for drawing the exhaust stream through the grease extractor, and that the invention is equally applicable to ventilating systems employing other air moving devices, such as power roof ventilators and the like.

As the hot exhaust stream enters the grease extractor 13, the relatively narrow vertical dimension of the entranceway 15 increases the velocity of the exhaust stream, while the horizontal elongation of the entranceway insures the collection of vapors across the full width of the cooking surface. The entering exhaust stream is deflected downwardly and rearwardly over the bottom wall 21 by means of an entrance baffle 30 formed as an integral part of the top portion 14a of the front wall, and inclined downwardly toward the bottom wall 21 at an angle of 18° from the horizontal. Both the top and bottom portions 14a and 14b of the front wall slope rearwardly from top to bottom with the bottom portion 14b being offset forwardly from the top portion 14a so that the upper and lower horizontal edges of the entranceway are in substantial vertical alignment whereby any liquid dripping from the underside of the entrance baffle 30 falls inside the front wall portion 14b. At the rear of the extractor the rear wall 20 deflects the high velocity exhaust stream upwardly past the rear edge of the entrance baffle 30 until the stream is deflected forwardly by a rear baffle 31 projecting forwardly from the rear wall 20 at least as far as the rear edge of the entrance baffle 30, and spaced upwardly therefrom. The exhaust stream flows forwardly over the entrance baffle 30 until it is deflected upwardly again by the top portion 14a of the front wall 14. Thus, it can be seen that the combination of the entrance baffle 30, the bottom wall 21, the rear wall 20, and the rear baffle 31 effects a 180° reversal in the direction of flow of the exhaust stream. That is, the exhaust flows rearwardly beneath the entrance baffle 30 as it enters the housing, and is then quickly reversed so as to flow toward the front of the housing above the entrance baffle 30. The centrifugal action resulting from this flow reversal causes a substantial portion of the condensable grease and oil entrained in the exhaust stream to be deposited or plated out on the surrounding walls and baffle surfaces, thereby providing an ititial extraction stage. The extracting action in this initial stage is enhanced by an increase in the volume of the extraction chamber in which flow reversal is effected. More particularly, the volume of the chamber formed by the lower portion 14b of the front wall 14, the bottom wall 21, and the rear wall 20 increases in the area adjacent the juncture of the bottom wall 21 and the rear wall 20, thereby causing the exhaust stream to expand simultaneously with the reversal in its direction of flow, with resultant condensation and agglomeration of the grease and oil vapors therein. A smaller secondary expansion chamber is formed in the area adjacent the juncture of the rear wall 20 and the rear baffle 31, with similar effect.

As the exhaust stream moves forwardly over the entrance baffle 30, its direction of flow is reversed a second time by the deflecting action of a top baffle 32 secured to the upper front wall 14a above the rear baffle 31. This baffle 32 deflects the rising exhaust stream rearwardly above the rear baffle 31, and the stream then passes straight up through the exit opening 17 into the duct 22. A pair of expansion chambers are again provided in the course of the second flow reversal, namely in the areas adjacent the juncture of the entrance baffle 30 and the front wall portion 14a, and adjacent the juncture of the front wall portion 14a and the baffle 32. The resulting expansion of the high velocity exhaust stream and the concurrent centrifugal action from the 180° turn in the fluid flow again produces a heavy deposition or plating out of the agglomerated grease and oil on the surrounding wall and baffle surfaces.

Since the grease extractor is located directly over or adjacent to the cooking surface 11, the surfaces of the extractor walls and the internal baffles on which the extracted grease and oil is deposited, are at a sufficiently high temperature to cause the deposited material to remain in a fluid condition and run down to the bottom of the housing. This grease and oil eventually collect on the bottom wall 21 where they flow out of the extractor through a drain opening 33. The extracted grease and oil is thus continuously removed from the extractor, thereby avoiding any substantial accumulation of condensed materials which might become re-entrained in the exhaust stream or which might present a fire hazard. From the drain opening 33, the condensed materials are conducted through a drain line (not shown) to a suitable external receptacle for disposal.

In accordance with an important aspect of the present invention, the rear baffle 31 is formed of a single sheet of metal which is turned back at the forward end of the baffle to form a fluid manifold extending across the length of the baffle and to strengthen the rear baffle, and a plurality of nozzles in fluid communication with such manifold are spaced along the top and the bottom of the manifold for discharging a selected fluid into the extractor both above and below the rear baffle. Thus, in the illustrative embodiment of the invention, the forward end of the rear baffle 31 is turned back along the underside of the baffle to form a fluid manifold 40 extending across the full length of the baffle 31 at the forward edge thereof. The longitudinal edge 40A of the turned back portion of the baffle sheet is flattened against the underside of the main body portion of the baffle 31 and joined thereto by a fluid-tight continuous weld extending across the full length of the baffle. Thus, it can be seen that the fluid manifold is formed by simple press braking and welding operations which can be efficiently carried out to form the desired integral manifold-baffle structure. Moreover, the turning back of the forward end portion of the baffle sheet not only forms the integral fluid manifold 40, but also strengthens the baffle 31 so that it can support a plurality of nozzles 41 and 42 threaded into the top and bottom surfaces, respectively, of the manifold 40 at spaced intervals along the length thereof.

The purpose of the manifold 40 is to provide a single fluid supply line for dispensing fluid for cleaning and/or fire extinguishing purposes through the nozzles 41 and 42 into all the internal spaces of the extractor 13. Thus, the nozzles 41 on the top of the baffle 31 discharge fluid into all areas of the upper region of the extractor, both above and below the top baffle 32 mounted on the front wall 14a. The lower nozzles 42, which are preferably located just slightly forward of the rear edge of the entrance baffle 30, discharge fluid into all areas of the lower region of the extractor, both above and below the entrance baffle 30. Since the fluid is normally supplied to the manifold 40 through ingress tube 44 under a substantial pressure, it tends to splash onto all the surfaces in both the upper and lower regions of the extractor, and then runs downwardly over such surfaces to the bottom wall 21, and eventually to the drain opening 33 for removal from the extractor housing in the same manner described above in connection with the extracted materials. It will be appreciated that the illustrative extractor is continuously self-draining, and there are no non-draining areas in which the liquids can remain within the interior of the extractor, so that both extracted liquids and cleaning liquids are always free to flow downwardly to the drain opening 33. The locations of the ingress tube 44 and drain opening 33 are not critical and may be altered to suit local engineering requirements for different extractor installations.

In keeping with further features of the invention, the top portion of the front wall of the extractor is removable to provide access to the interior of the extractor for cleaning and service purposes, and the rear baffle 31 and the fluid manifold 40 formed thereby are removably mounted on the rear wall of the extractor. Thus, the top portion 14a of the front wall 14 forms a rearwardly extending flange 50 which fits over a recessed area 51 at the front edge of the top wall 16, with a depending flange 52 resting against the inside surface of the front wall. The top wall 16 and the front wall 14a are fastened together by means of a plurality of bolts 53 threaded through the front wall member 14a and the flange 52. Similarly, at both of the side edges of the front wall member 14a, additional bolts 53 are threaded through the member 14a and inturned flanges formed by the respective side walls 18 and 19, such as the flange 18a shown in FIG. 2. In order to gain access to the interior of the extractor, the bolts 53 are simply removed to release the front wall member 14a, which is then detached from the front of the extractor.

After the interior of the extractor is exposed by removal of the front wall member 14a, the rear baffle 31 and the fluid manifold 40 formed thereby may be removed by simply removing a series of cap nuts 54 which are threaded onto a series of threaded studs welded to a support plate 56 to fasten a clamping plate 55 to the support plate 56 which is spot welded to the rear wall 20 of the extractor. The rear portion of the baffle 31 is bent upwardly to form a top flange 57 which is clamped against the support plate 56 by the clamping plate 55, and is then bent downwardly to form a lower flange 58 which is supported in a U bend formed by the lower end of the support plate 56. Thus, when the clamping plate 55 is removed, the baffle 31 can be easily detached from the rear wall of the extractor. Such removal of the baffle 31 may be required after prolonged operation of the extractor for the purpose of de-lining, adjustment, cleaning and/or replacing the various nozzles 41 and 42 or other service. Conversely, assembly of the manifold-baffle structure is facilitated both during original manufacture and after removal thereof for servicing or the like. In this connection, it will be noted that the configuration of the manifold-baffle unit 31 is such that this component can be easily prefabricated in mass production in long units which are then subsequently cut into the lengths required for extractors of different sizes.

In accordance with another specific aspect of the invention, the top baffle 32 is designed to provide reinforcement for the otherwise unsupported central span of the front wall member 14a. Thus, the baffle 32 is formed from a single sheet of metal bent at a 35° angle to form a general V shape, and the lower leg of the V is welded to the side walls 18 and 19 and secured to the front wall member 14a to provide the desired reinforcement and rigidity. More specifically, the two legs of the V form integral flanges 32a and 32b which fit against the front wall member 14a, and the flange on the lower leg is fastened to the front wall by bolts 59 which can be easily removed to detach the front cover 14a from the extractor. To prevent leakage of fluid through the interface between the front cover 14a and the end walls 18 and 19, vertically extending gaskets 60 are provided along the inside surface of the front panel 14a where it is friction fitted to the end panels 18 and 19, and extending downwardly between the baffle 30 and a pair of flanges 30a welded to the end walls 18 and 19. Similarly, a horizontal gasket 61 is provided between the front panel 14a and the flange on the lower leg of the baffle 32 to prevent the leakage of fluid up into the hollow interior of the baffle 32, and a horizontal gasket 62 is provided between the top of the front panel 14a and the depending top flange 52.

It will be appreciated that the illustrative extractor may be fabricated from relatively few parts. Thus, the top front wall member 14a and the entrance baffle 30 are formed from a single sheet of metal; the bottom front wall member 14b, the bottom wall 21, the rear wall 20, the top wall 16, and the two sidewalls 18 and 19 are all formed from a single sheet of metal; the baffle 32 is a single sheet; and, as described previously, the baffle 31 and the fluid manifold 40 are formed from a single sheet of metal. The only additional parts required are the nozzles 41 and 42, the clamping plate 55, the support plate 56, the flanges 30a, the gaskets 60–62, the bolts 53 and 59 and the nuts 54. Accordingly, it can be seen that this extractor can be fabricated quickly and at a relatively low cost.

As can be seen from the foregoing detailed description, this invention provides a grease extractor which combines good grease extraction, a low manufacturing cost, and the capability of distributing selected cleaning and/or fire extinguishing fluids throughout the interior of the extractor. The formation of the main fluid manifold as an integral part of the rear baffle 31 provides a component structure which cannot only be efficiently manufactured, but also can be prefabricated using mass production techniques at times when the manufacturing plant would not otherwise be operating at maximum capacity, thereby further reducing the manufacturing costs. The extractor provided by this invention is in the form of a module which can be used in a variety of different types and sizes of ventilator systems, and it is easy to install and maintain. Furthermore, the extractor itself can also be readily fabricated in a variety of different sizes. Easy access to the interior of the extractor, combined with the removability of the rear baffle 31 which forms the fluid conduit and carries the fluid discharge nozzles 41 and 42, greatly facilitates service and maintenance of the extractor.

I claim as my invention:

1. A grease extractor for removing grease, oil, and other contaminants from a vaporous exhaust stream in a kitchen ventilating system, said extractor comprising the combination of a housing having top and bottom walls, front and rear walls, and a pair of side walls, said front wall forming a restricted, horizontally elongated entranceway for receiving the vaporous exhaust stream; an entrance baffle extending rearwardly from the top of the entranceway for deflecting the entering exhaust stream rearwardly over the bottom wall and against said rear wall for deflecting the exhaust stream upwardly past the rear edge of said entrance baffle; a substantially horizontal rear baffle extending forwardly from said rear wall above said entrance baffle toward the front wall of the extractor, said rear baffle extending forwardly beyond the rear edge of said entrance baffle and being formed of a single sheet of metal which is turned back at the forward end of the baffle to form a fluid manifold extending across the length of the baffle and to strengthen said rear baffle, and the turned back portion of the single sheet of metal has a longitudinal edge which is joined to the main body portion of said sheet by a fluid-tight continuous well extending across the full length of the baffle; a plurality of nozzles in fluid communication with said manifold and spaced along both the top and bottom of said manifold for discharging a selected fluid into the extractor both above and below said rear baffle; top baffle means extending rearwardly from said front wall above said rear baffle means for deflecting the exhaust stream rearwardly from said front wall; an exit opening formed by the top wall of said housing for discharging the exhaust stream from the extractor; and drain means in said bottom wall for receiving the extracted contaminants deposited on said baffle means and the walls of said housing and conducting the same out of the housing.

2. A grease extractor as set forth in claim 1 wherein said rear baffle is removably mounted on the rear wall of the extractor.

3. A grease extractor as set forth in claim 1 wherein said nozzles on the bottom of said manifold are located forwardly of the rear edge of said entrance baffle.

4. A grease extractor as set forth in claim 1 wherein said entrance baffle is formed as an integral part of the top portion of said front wall.

5. A grease extractor as set forth in claim 1 wherein said bottom wall is formed as an integral part of the lower portion of said front wall.

6. A grease extractor as set forth in claim 1 wherein said top baffle means is V shaped and the bottom leg of the V is secured by bolts to said front wall to provide reinforcement for the front wall.

7. A grease extractor as set forth in claim 1 wherein said top, rear and bottom walls and the lower portion of said front wall are all formed from a single sheet of metal.

8. A grease extractor as set forth in claim 1 wherein said front wall slopes rearwardly from top to bottom with the portion of the front wall below said entranceway being offset forwardly from the portion of the front wall above said entranceway so that the lower and upper horizontal edges of said entranceway are in substantial vertical alignment whereby any liquid dripping from the underside of said entrance baffle falls inside said front wall.

9. A grease extractor as set forth in claim 1 wherein the top portion of said front wall is removable from the extractor housing to provide access to the interior of the extractor for cleaning and service purposes.

10. A grease extractor as set forth in claim 9 wherein said top baffle means is mounted on said end walls, the removable top portion of said front wall is removably mounted on said top baffle means, and said rear baffle is removably mounted on said rear wall of the extractor.

* * * * *